C. H. TOWNSEND.
WIND SHIELD FOR AUTOMOBILES.
APPLICATION FILED NOV. 18, 1913.
1,110,729. Patented Sept. 15, 1914.
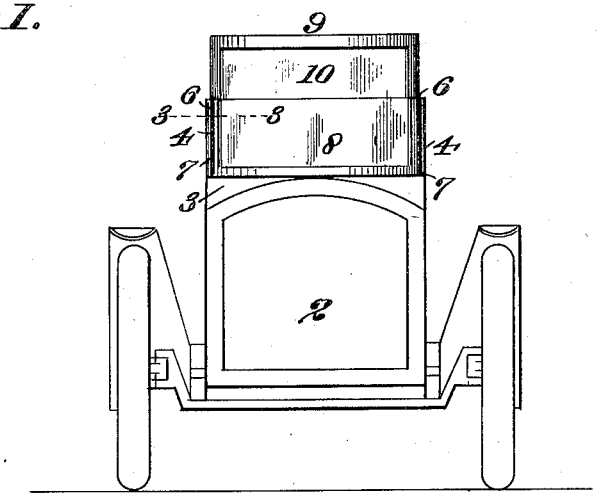
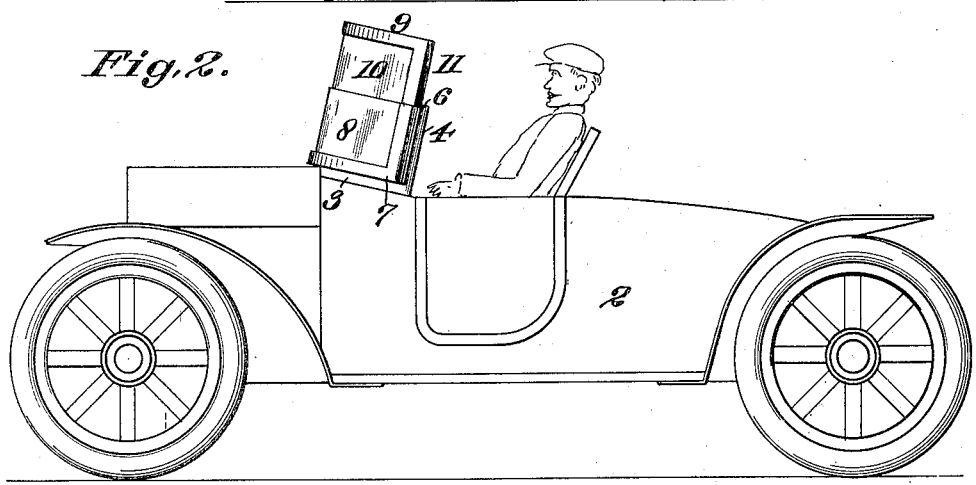
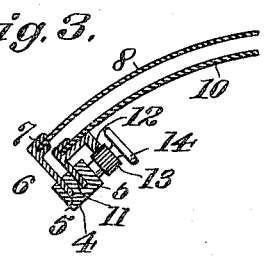 
WITNESSES:
Charles Pickles
F. E. Maynard.
INVENTOR
Charles H. Townsend
BY G. H. Strong
ATTORNEY

UNITED STATES PATENT OFFICE.

CHARLES H. TOWNSEND, OF BERKELEY, CALIFORNIA.

WIND-SHIELD FOR AUTOMOBILES.

1,110,729.  Specification of Letters Patent.  Patented Sept. 15, 1914.

Application filed November 18, 1913. Serial No. 801,621.

*To all whom it may concern:*

Be it known that I, CHARLES H. TOWNSEND, a citizen of the United States, residing at Berkeley, in the county of Alameda and State of California, have invented new and useful Improvements in Wind-Shields for Automobiles, of which the following is a specification.

This invention relates to wind shields for vehicles and particularly for motor vehicles.

The object of the present invention is to provide a wind shield composed of an arcuate, vertically arranged sectional window or window structure, each of the sections being independently movable and removable from its frame or sill structure which is rigidly mounted on the dashboard of the motor vehicle.

Another object is to provide a wind shield for automobiles which will at once increase the unobstructed range of view through a large arc of vision by its arcuate form and mounting in front of the driver of the vehicle; one of the advantages of the arcuate formation of the wind shield being a substantial reduction of wind pressure against the same during the movement of the vehicle.

A further object and feature of the invention is the provision of a wind shield of sections, these being vertically telescoping and adjustable so that they can be readily and quickly positioned in front of the operator of the vehicle as divers conditions may require.

The invention consists of a wind shield structure, preferably of arcuate form and of vertically slidable sections which may be entirely and readily removed from their supporting frame on the vehicle.

It also comprises details of construction which will be more fully explained by reference to the accompanying drawings, in which—

Figure 1 is a front view of the vehicle with the improved wind shield adjusted thereon. Fig. 2 is a side view of the same. Fig. 3 is a transverse sectional view on line 3—3 of Fig. 1. Fig. 4 is a detail view of the shield sections.

I have shown the invention as applied to an automobile 2, which may be of any type, and adjacent to the dashboard thereof there is secured an arcuate sill 3, curving forwardly in front of the driver's seat of the vehicle. The rear ends of the sill have vertical uprights or stiles 4 which are provided with substantially parallel, outwardly opening channels 5 of suitable width and depth.

Slidably fitting in the outermost guide channels 5 of the posts or stiles 4 are flanges 6 which are turned radially inwardly from a frame 7, which is arcuate in plan view, conforming to the sill 3. There is mounted in the frame 7 a suitable transparent window or shield 8, of arcuate form, which is suitably rabbeted in the frame 7; the whole wind shield structure, consisting of the frame 7 with its flanges 6 and the shield or window 8, being rigid and slidably adjustable in, and removable from the vertical channel posts 4. The height of the shield structure 7 is preferably sufficient to extend not above the horizontal plane and range of vision of the driver sitting in the automobile, so that he may have an unobstructed view above the shield 8, when necessary, and at the same time the shield affords a barrier against the wind blowing toward the driver in the vehicle when the vehicle is moving.

Slidable in the inner channels 5 of the vertical posts 4 is a second or upper shield section 9 of arcuate form in plan view and having a transparent window portion 10, the upper section having radially extending flanges 11 running in the guideways of the posts 4 whereby the upper section 9 is rendered slidable and telescopic behind the lower outermost or forward section 7 of the wind shield. Suitable mechanical actuating and locking means may be utilized for moving the upper wind shield section 9 in its guideways; these means being shown as comprising vertical racks 12 fastened to the vertical side members of the section 9 and meshing with pinions 13 turnably mounted upon the inner sides of the posts 4. The pinions 13 may be turned by small hand wheels 14, or other appropriate devices, whereupon the upper sash section 9 would be raised or lowered telescoping respectively with the lower stationary section 7 of the shield.

Either of the shield sections may be moved and removed independently of the other, and the upper one may be adjusted to the desired height, with relation to the front edge of the lower stationary section 7, by the manipulation of the pinions 13.

From the foregoing it will be seen that I have provided an ornamental, substantial wind shield, which, being of curvilinear form in plan view, permits a wide range of vision by the operator of the car; the plane of the glass or other transparent material of the shield lying in an arc which may be, substantially concentric with the position of the driver of the vehicle.

Having thus described my invention, what I claim and desire to secure by Letters Patent is—

1. A wind-shield consisting of a pair of vertical guide posts which are each provided on their front faces with a pair of spaced channels, a pair of members of substantially U-shape in cross-section arranged on the exterior of said front faces of the posts and having their outer legs arranged in the respective inner channels of the posts and having rack teeth on their inner legs, pinions carried by the inner sides of the guide posts and meshing with said teeth, a transparent element connected at its ends to said members, a second pair of members of substantially L-shape in cross-section arranged on the exterior of said front faces of the posts and having one of their legs arranged in the respective outer grooves of the posts and having their opposite legs rabbeted, and a transparent element having its ends arranged in said rabbeted legs.

2. A wind-shield consisting of a pair of vertical guide posts which are each provided on their front faces with a pair of spaced channels, a pair of inner members arranged on the exterior of the front faces of the posts and having portions slidably arranged in the inner of said channels and having portions which are disposed adjacent to the inner side faces of said posts and which have rack teeth, pinions connected to said inner side faces of the posts and meshing with said teeth, a transparent element connected to said members and extending over and in front of the pinions and over the front faces of the posts, a pair of outer members arranged exterior to the outer faces of said posts and having portions arranged in the respective outer grooves, said outer members having rabbeted portions which extend beyond and over the outer face of said transparent element, and a transparent element having its ends arranged in said rabbeted portions of the outer member.

3. A wind-shield consisting of a pair of vertical guide posts which are each provided on their front faces with a pair of spaced channels, a pair of inner and a pair of outer members each arranged exterior to the outer faces of the posts, the inner members having portions which slide in the inner grooves and the outer members having portions which are arranged in the outer grooves, the outer members having parts which extend beyond the inner members, one of said inner members having a part which extends over the inner side face of the adjacent post, means to raise and lower said last named part from the inner side face of the post, a transparent element connected to said parts of the outer members, and a transparent element connected to said inner members.

In testimony whereof I have hereunto set my hand in the presence of two subscribing witnesses.

CHARLES H. TOWNSEND.

Witnesses:
R. G. RALSTON,
D. E. BARTON.